US008634291B2

(12) United States Patent
Tripathi et al.

(10) Patent No.: US 8,634,291 B2
(45) Date of Patent: Jan. 21, 2014

(54) ENERGY EFFICIENT MANAGEMENT OF DATALINKS

(75) Inventors: Sunay Tripathi, Palo Alto, CA (US); Nicolas G. Droux, San Jose, CA (US); Venugopal Vaidhyanathan Iyer, Fremont, CA (US)

(73) Assignee: Oracle America, Inc., Redwood Shores, CA (US)

( * ) Notice: Subject to any disclaimer, the term of this patent is extended or adjusted under 35 U.S.C. 154(b) by 282 days.

(21) Appl. No.: 12/693,955

(22) Filed: Jan. 26, 2010

(65) Prior Publication Data

US 2011/0185195 A1    Jul. 28, 2011

(51) Int. Cl.
*H04J 1/16* (2006.01)

(52) U.S. Cl.
USPC .......................................... 370/222; 370/223

(58) Field of Classification Search
USPC ............... 370/222–224, 238, 254, 255, 258, 370/351–356, 386, 466–469; 709/232–234, 709/235–242, 250
See application file for complete search history.

(56) References Cited

U.S. PATENT DOCUMENTS

| 2004/0015571 | A1 | 1/2004 | Miyazaki et al. |
| 2006/0126844 | A1* | 6/2006 | Mauro ........................... 380/261 |
| 2006/0221841 | A1* | 10/2006 | Lee et al. ...................... 370/242 |
| 2007/0178897 | A1* | 8/2007 | Lagnado et al. ............... 455/434 |
| 2008/0005303 | A1* | 1/2008 | Rotithor et al. ................ 709/223 |
| 2008/0279104 | A1 | 11/2008 | Chen et al. |
| 2009/0086650 | A1* | 4/2009 | Moore et al. ................... 370/253 |
| 2009/0185565 | A1 | 7/2009 | Diab et al. |
| 2009/0213741 | A1 | 8/2009 | Wang et al. |
| 2010/0069126 | A1* | 3/2010 | Wang et al. .................... 455/574 |
| 2010/0312941 | A1* | 12/2010 | Aloni et al. ..................... 710/310 |
| 2011/0185370 | A1* | 7/2011 | Tamir et al. .................... 719/324 |

OTHER PUBLICATIONS

Droux, Nicolas, "Crossbow APIs for Device Drivers", Solaris Kernel Networking, Sun Microsystems, Inc., Apr. 8, 2009, 26 pages.
Jiao, Y., Hurson, A., and Shirazi, B., "Adaptive Application-Driven WLAN Power Management," Pervasive and Mobile Computing, Elsevier, Apr. 13, 2007, 21 pages.
International Search Report in Related International Applicaiton No. PCT/US2011/020243, dated Apr. 8, 2011, 4 pages.
International Preliminary Report on Patentability for PCT/US2011/020243 mailed Aug. 9, 2012 (8 pages).

* cited by examiner

*Primary Examiner* — Hassan Phillips
*Assistant Examiner* — Ajay Cattungal
(74) *Attorney, Agent, or Firm* — Osha Liang LLP (57) ABSTRACT

A system including a first physical network interface card (NIC) include a number of rings, where at least one of the rings is an active ring. The system further includes a host, operatively connected to the first NIC, and including Media Access Control (MAC) layer. The MAC layer is configured to obtain a power management policy, obtain a load associated with the active ring, determine, using the power management policy and the load, that the state associated with at least one of the rings must be changed, and change, in response to the determining, the state of at least one of the of rings.

14 Claims, 7 Drawing Sheets

| Time | Load | Action Taken | Active Rings after Action |
|---|---|---|---|
| t1 | X | None | Ring A, Ring B, Ring C, Ring D |
| t2 | X + 1 | None | Ring A, Ring B, Ring C, Ring D |
| t3 | X + 2 | Ring Activated | Ring A, Ring B, Ring C, Ring D, Ring E |
| t4 | X − 3 | Ring Deactivated | Ring A, Ring B, Ring C, Ring D |
| t5 | X − 1 | None | Ring A, Ring B, Ring C, Ring D |
| t6 | X − 2 | Ring Deactivated | Ring A, Ring B, Ring C |
| t7 | X − 4 | Ring Deactivated | Ring A, Ring B |
| t8 | X + 2 | Ring Activated | Ring A, Ring B, Ring C |

ENERGY EFFICIENT MANAGEMENT OF DATALINKS

BACKGROUND

Network traffic (typically in the form of packets) is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic, typically in the form of packets. In addition, modern NICs may include multiple receive rings and transmit rings.

In order to send network traffic, a NIC must be provided with a sufficient amount of power. Such power may depend upon the amount of network traffic sent via the NIC.

SUMMARY

In general, in one aspect, the invention relates to a system. The system includes a first physical network interface card (NIC) comprising a plurality of rings, wherein at least one of the plurality of rings is an active ring, and a host, operatively connected to the first NIC, comprising a Media Access Control (MAC) layer configured to obtain a power management policy, obtain a load associated with the active ring, determine, using the power management policy and the load, that the state associated with at least one of the plurality of rings must be changed, and change, in response to the determining, the state of at least one of the plurality of rings.

In general, in one aspect, the invention relates to computer readable medium comprising software instructions for managing datalinks, wherein the software instructions, when executed, perform a method. The method includes obtaining, by a Media Access Control (MAC) layer executing on a host, a power management policy, obtaining, by the MAC layer, a load associated an active ring residing on a physical network interface card (NIC), wherein the NIC comprises a plurality of rings, determining, using the power management policy and the load, that the state associated with at least one of the plurality of rings must be changed, and changing, in response to the determining, the state of at least one of the plurality of rings.

In general, in one aspect, the invention relates to a method for managing datalinks, The method including obtaining, by a Media Access Control (MAC) layer executing on a host, a power management policy, obtaining, by the MAC layer, a load associated an active ring residing on a physical network interface card (NIC), wherein the NIC comprises a plurality of rings, and wherein the NIC is operatively connected to the host, determining, using the power management policy and the load, that the state associated with at least one of the plurality of rings must be changed, and changing, in response to the determining, the state of at least one of the plurality of rings.

DETAILED DESCRIPTION

Exemplary embodiments of the invention will be described with reference to the accompanying drawings. Like items in the drawings are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to managing datalinks on a physical network interface card (NIC). Specifically, embodiments of the invention relate to managing a number of datalinks (or rings) on a NIC in order to achieve an efficient use of the energy provided to the datalinks.

Figure 1A:
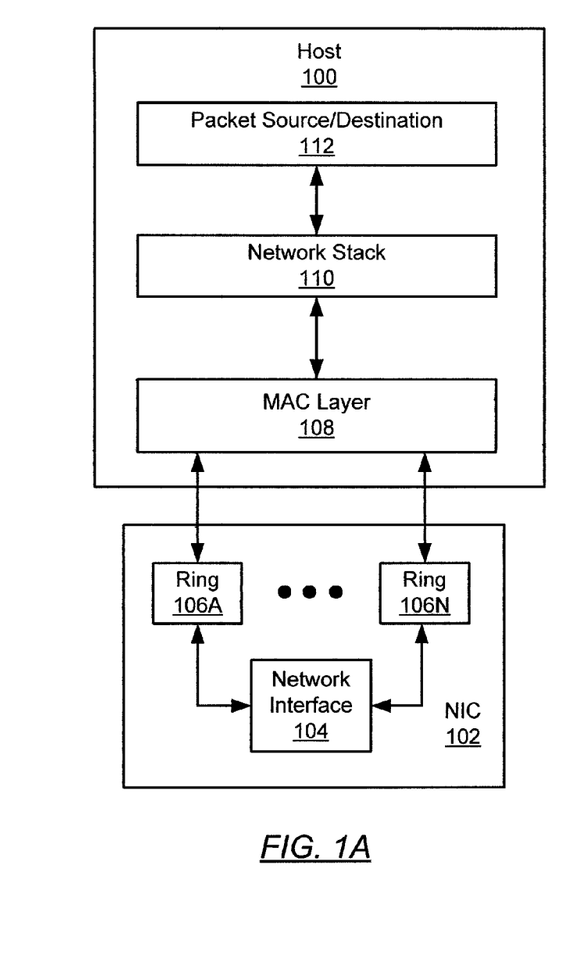
FIG. 1A shows a system in accordance with one or more embodiments of the invention.

FIG. 1A shows a system in accordance with one embodiment of the invention. As shown in FIG. 1, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (104) (i.e., the hardware on the NIC (102) used to interface with the network). For example, the NI (104) may correspond to an RJ-45 connector, a wireless antenna, etc. The packets received by the NI (104) are then forwarded to other components on the NIC (102) for processing, etc. In one embodiment of the invention, the NIC (102) includes a classifier (not shown) and one or more rings (106A, 106N) used to receive and transmit network traffic. In one embodiment of the invention, the rings (106A, 106N) correspond to portions of memory within the NIC (102) used to temporarily store packets before the packets are copied to the host (100) or transmitted over the network via the NI (104). In one embodiment of the invention, the classifier (not shown) configured to analyze the incoming network traffic, and forward that traffic to one of the rings (106A, 106N).

In one embodiment of the invention, the NIC (102) includes functionality to change the state of each ring (106A, 106N). More specifically, each ring (106A, 106N) may be configured to be active or inactive. A ring (106A, 106N) in an active state may be referred to as an active ring. In one embodiment of the invention, an active ring facilitates the transmission of network traffic between the host (100) and the network interface (104). In one embodiment of the invention, a ring (106A, 106N) in an inactive state may be referred to as an inactive ring. In one embodiment of the invention, an inactive ring does not receive or send network traffic between the host and the network interface. When a ring (106A, 106N) is transitioned from inactive to active by elements within the NIC (102), such a transition may be referred to as activating, turning on, or powering up the ring (106A, 106N). When a ring (106A, 106N) is transitioned from active to inactive by elements within the NIC (102), such a transition may be referred to as deactivating, turning off, or powering down the ring (106A, 106N).

In one embodiment of the invention, an inactive ring may continue to consume power after it has been powered down. In one embodiment of the invention, an inactive ring consumes less power than a corresponding active ring. In other words, the amount of power consumed by an active ring over a given period of time is greater than the amount of power consumed by an inactive ring over the same period of time. In one embodiment of the invention, one or more active rings may be powered down in order to achieve one or more objectives associated with the NIC (102) or the entire system. In one embodiment of the invention, the one or more underutilized rings may be powered down in order to reduce the overall amount of power used by the NIC (102). In one embodiment of the invention, individual rings (106A, 106N) may be turned on or turned off in order to reduce the operating temperature of the NIC (102). Further examples of system objectives are discussed below.

Continuing with the discussion of FIG. 1A, the host (100) includes a media access layer (MAC) layer (108), a network stack (110), and a packet source/destination (112). In one embodiment of the invention, the MAC layer (108) (or more specifically, a thread executing within the MAC layer (108)) may include the functionality to interact with the NIC (102), via a device driver (not shown). Further, the MAC layer (108) includes functionality to interface with the network stack (110).

In one embodiment of the invention, the network stack (110) includes functionality to process packets in accordance with various protocols used to send and receive packets (e.g., Transmission Communication Protocol (TCP), Internet Protocol (IP), User Datagram Protocol (UDP), etc.). Each network stack (110) may also include functionality to send and receive packets from one or more associated packet source/destinations (112).

In one embodiment of the invention, the network stack (110) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, the packet source/destination (112) refers to an element within the host which initiates a network connection, and may correspond to a container or service executing within the host (100). The host (100) may include more than one packet source/destination (112), and each packet source/destination (112) may be associated with one or more network stacks (110) and one or more rings (106A, 106N). In one embodiment of the invention, the packet source/destination (112) and network stack (110) may be executing within a virtual machine (not shown) which interacts with the MAC layer (108) to send and receive network traffic.

Figure 1B:
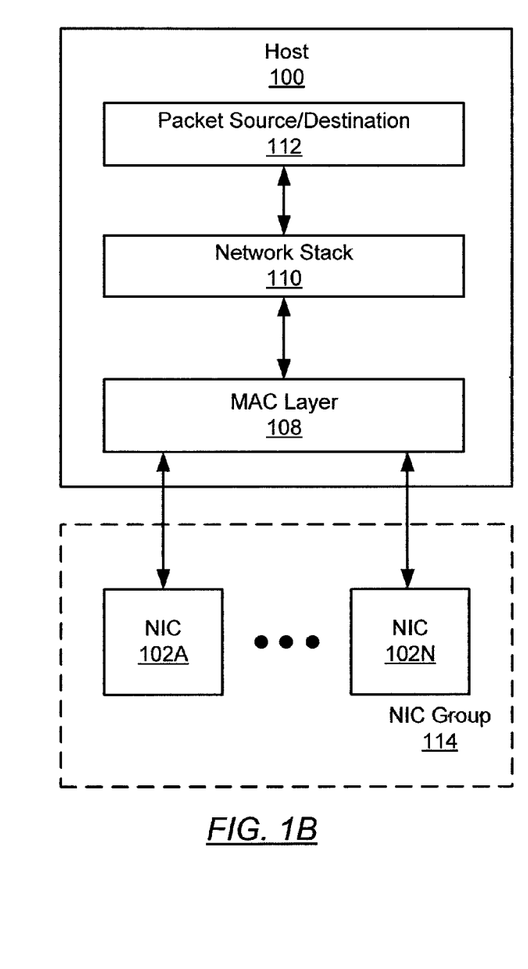
FIG. 1B shows a system in accordance with one or more embodiments of the invention.

FIG. 1B shows a system in accordance with one embodiment of the invention. The system depicted in FIG. 1B includes multiple NICs (102A, 102N) within a NIC group (114). In one embodiment of the invention, the NIC group (114) may correspond to an aggregation of NICs which operates like a single NIC connected to the host (100). Other elements depicted in FIG. 1B are substantially similar to those described with regard to FIG. 1A. In one embodiment of the invention, the MAC layer may include functionality to manage the aggregation of NICs.

Figure 1C:
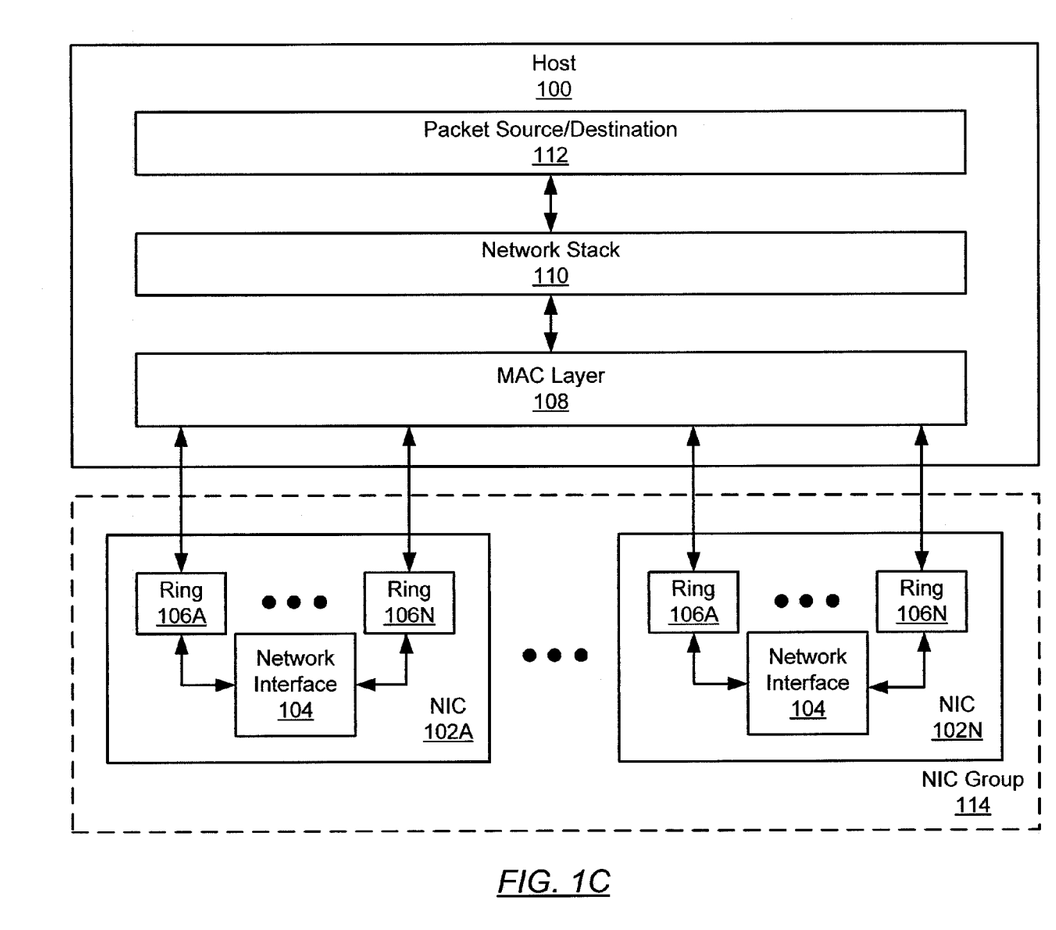
FIG. 1C shows a system in accordance with one or more embodiments of the invention.

FIG. 1C shows a system in accordance with one embodiment of the invention. The system depicted in FIG. 1C includes a NIC group (114) including multiple NICs (102A, 102N), each of which includes multiple rings (106A, 106N). Other elements depicted in FIG. 1C are substantially similar to those described with regard to FIG. 1A.

Figure 2:
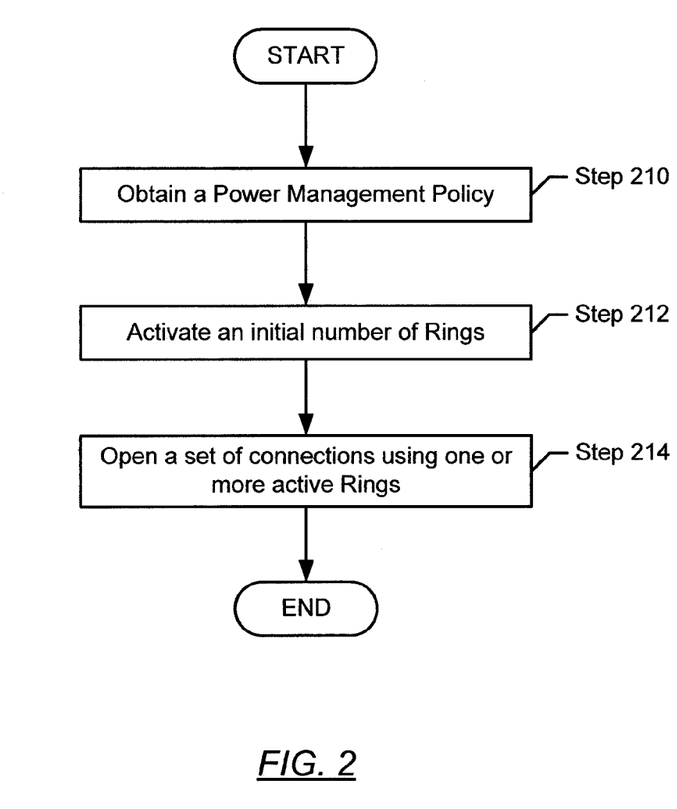
FIG. 2 shows a flowchart in accordance with one or more embodiments of the invention.

FIG. 2 shows a flow chart for initializing a set of rings associated with network stack or virtual machine in accordance with one or more embodiments of the invention. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In Step 210, the MAC layer obtains a power management policy (examples of power management policies are explained below). In Step 212, the MAC layer activates an initial number of rings. In one embodiment of the invention, the initial number of activated rings is dictated by the power management policy. In one embodiment of the invention, only one ring is activated until a need exists to active subsequent rings. In Step 214, the network stack opens a set of connections using one or more of the active rings. In one embodiment of the invention, a connection refers to a logical path between two physical network devices, two virtual network devices, or one physical and one virtual network devices, across which data is transmitted. In one embodiment of the invention, multiple connections may be opened using a single active ring.

The following are examples of various power management policies. The following power management policies are included for exemplary purposes only and should be construed as limiting the invention.

Example Power Management Policy 1—The policy specifies a maximum allowed power consumption, which is less than the total of the maximum power available to the NIC. The policy also specifies how rings are activated and deactivated on the NIC. The policy may be augmented to take into account all (or additional) power consumption related to elements within the NIC other than the rings. For example, the policy may take into account power consumption of the cooling mechanisms associated with the rings (e.g., power to run fans to cool the rings).

Example Power Management Policy 2—This policy provides additional rings as needed. The minimum number of rings, necessary to process the active connections, are activated. The policy also provides a maximum tolerated rate of dropped packets, as well as a minimum rate at which traffic is processed by each ring. As network traffic increases or decreases (i.e., the load changes), rings are activated or deactivated.

Example Power Management Policy 3—This policy defines how to dispatch rings on the NIC or NICs of the system. This policy may define an order in which rings are activated or deactivated. For example, rings may be activated on a NIC with active rings before rings are activated on a NIC with no active rings. Further, rings may be deactivated on a NIC with at least one inactive ring before deactivating rings on a NIC with no inactive rings. Alternatively, the policy may activate and deactivate rings such that each ring is deactivated for a minimum period of time before a single ring is deactivate for a period of time exceeding that minimum.

Example Power Management Policy 4—This policy specifies environmental and/or external factors to take into account when activating or deactivating rings. For example, the policy may specify the maximum operating temperature for a given NIC or computer in which the NIC is located (e.g., server, blade server, desktop computer, laptop, etc.).

Example Power Management Policy 5—This policy defines when specific power management policies should be applied and the duration for which they are applied. For example, this policy may specify that between 6:00 am and 6:00 pm Example Power Management Policies 2 and 4 should be applied and between 6:01 pm and 5:59 am Example Power Management Policy 1 should be applied.

Those skilled in the art will appreciate that any of the aforementioned policies may be pre-defined in the operating system, provided by the user, and/or modified by the user.

Figure 3:
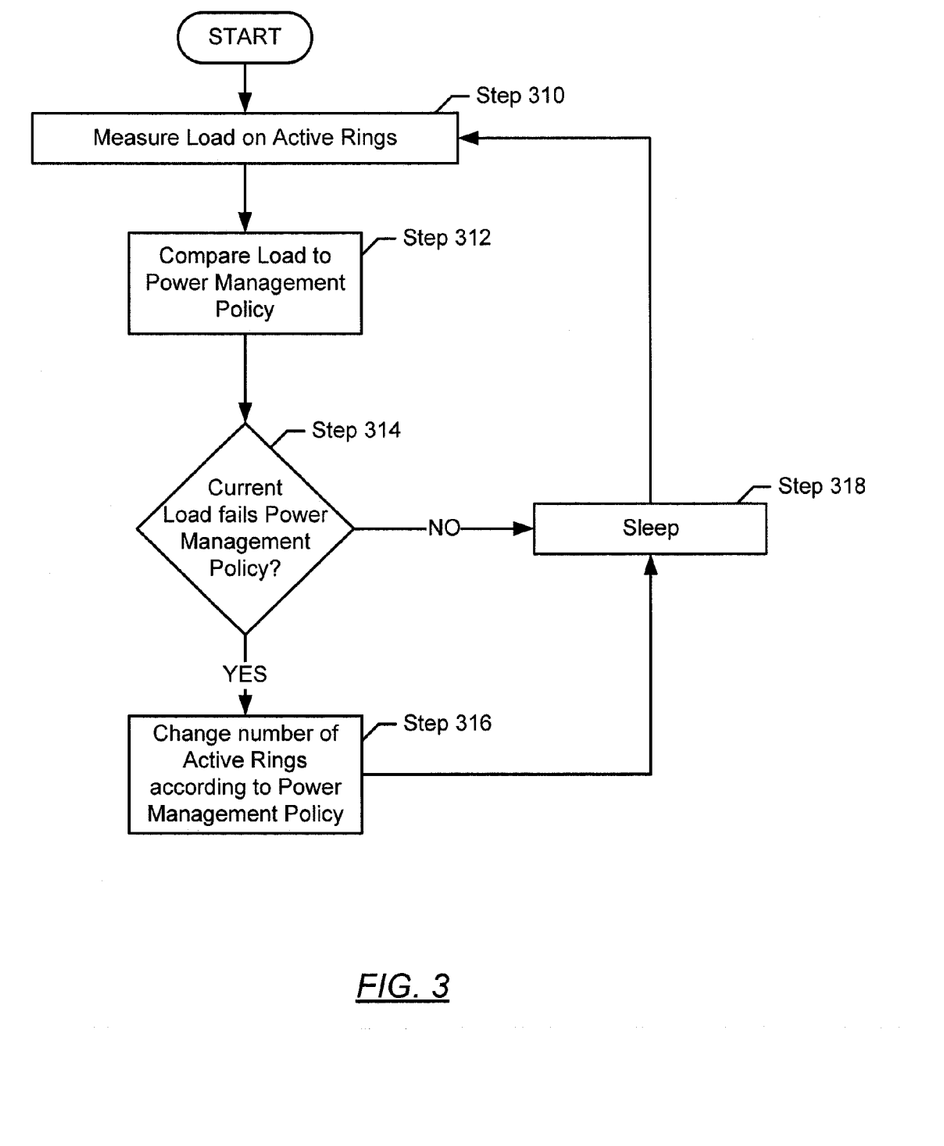
FIG. 3 shows a flowchart in accordance with one or more embodiments of the invention.

FIG. 3 shows a flow chart for power managing a NIC or set of NICs in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In Step 310, the network stack measures the load on the active rings. In one embodiment of the invention, the term load may refer to the rate of network traffic sent using a set of rings (e.g. data transferred over a period of time), and/or may include the effect of that traffic on the system (e.g., internal temperature of the NIC, power consumption of the set of rings, etc.). In Step 312, the load is compared to a power management policy. In Step 314, a determination is made as to whether the current load fails to meet the objectives of the power management policy. If the objectives of the policy are not met, then in Step 316, the number of active rings is adjusted according to the currently implemented power management policy. In one embodiment of the invention, network traffic is redistributed across all active rings following the activation or deactivation of rings within the system. In Step 318, the system sleeps before returning to Step 310. If in Step 314, the load is consistent with the objectives of the power management policy, then in Step 318, the system sleeps before returning to Step 310.

Figure 4A:
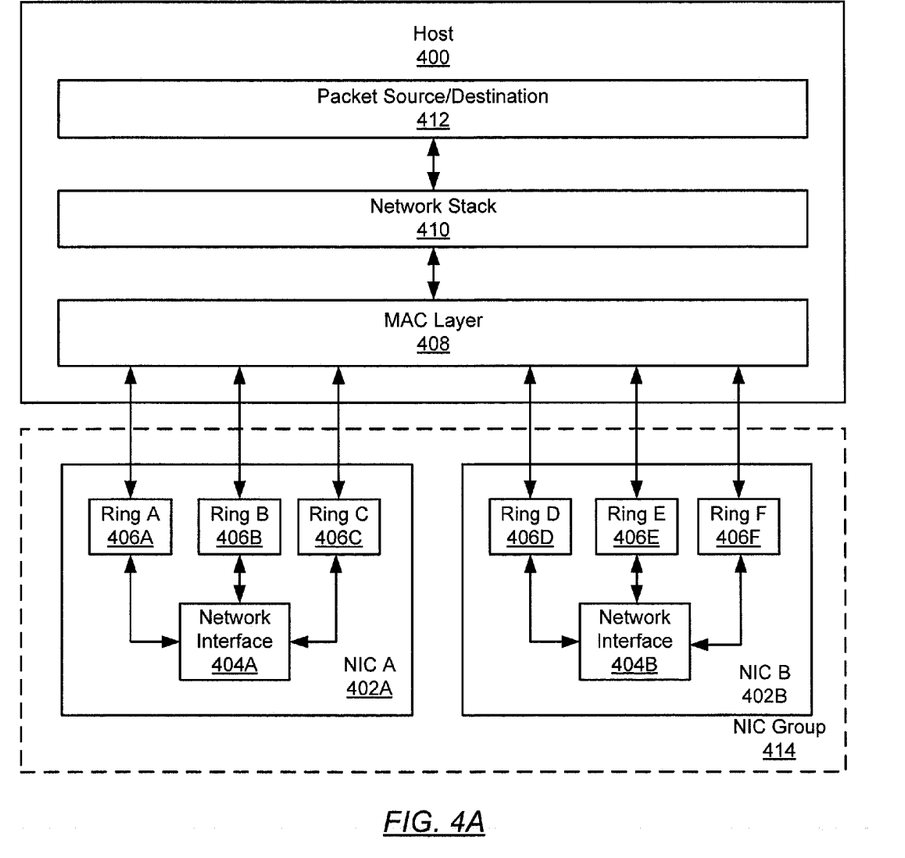
FIG. 4A shows an example in accordance with one or more embodiments of the invention.
Figure 4B:
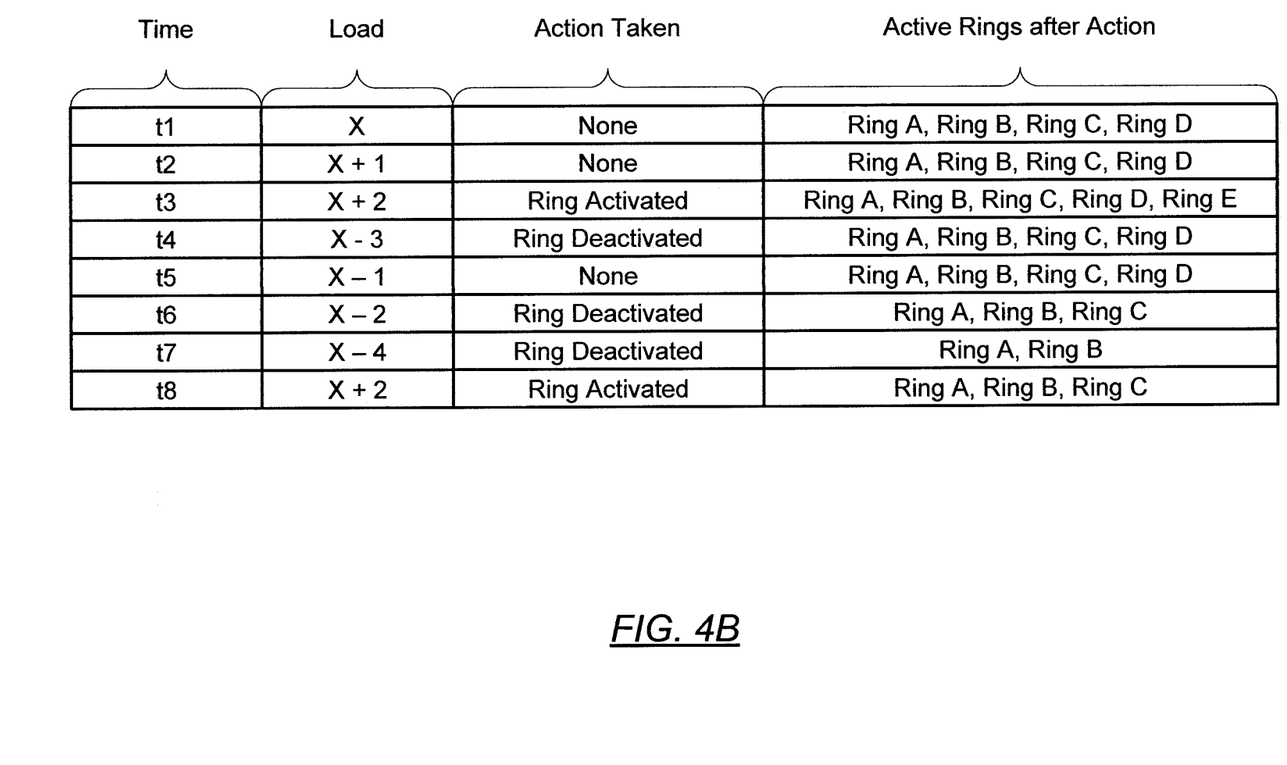
FIG. 4B shows an example in accordance with one or more embodiments of the invention.

FIGS. 4A and 4B show an exemplary configuration and timeline, respectively, in accordance with one embodiment of the invention. The exemplary system is not intended to limit the scope of the invention. Further, some elements unnecessary for the purposes of the exemplary figure may have been omitted.

As depicted in FIG. 4A, the exemplary configuration includes a host (400) operatively connected to a NIC group (414). The NIC group (414) includes NIC A (402A) and NIC B (402B). Each NIC (402A, 402B) includes a network interface (404A, 404B) and three rings (406A, 406B, 406C, 406D, 406E, 406F). Each of the rings sends and receives network traffic via the MAC layer (408) residing on the host (400). The MAC layer (408) sends and receives network traffic via the network stack (410), which in turn processes incoming and outgoing traffic associated with the packet source/destination (412).

For the purposes of the example depicted in FIGS. 4A and 4B, assume that the power management policy implemented by the system dictates that a single ring, if available, is activated when the load exceeds X+1. Further, assume that the power management policy dictates that a single ring is deactivated if (i) the load falls below X−1, and (ii) more than one ring is currently active. Assume also that the power management policy dictates that rings are to be activated on a NIC with currently active rings before a ring is activated on a NIC with no currently active rings. Assume also that the management policy dictates that the total load is distributed evenly (or redistributed evenly) across all active rings. Finally, assume that the power management policy dictates that rings are to be deactivated on a NIC with at least one other inactive ring before a ring is deactivated on a NIC with no other inactive rings.

Assume for the purposes of the example depicted in FIGS. 4A and 4B that at some time t0, Ring A (406A), Ring B (406B), Ring C (406C), and Ring D (406D) are active. As depicted in the exemplary timeline depicted in FIG. 4B, at some time t1, the load on the rings is measured at X. Because the load does not exceed X+1 and is not below X−1, no action is taken. At some time t2, the load is measured at X+1. Because the load does not exceed X+1 and is not below X−1, no action is taken. At some time t3, the load is measured at X+2. Because the load now exceeds X+1, one ring is activated. Ring E (406E) is activated. At some time t4, the load is measured at X−3. Because the load is below X−1, a ring is deactivated. Ring E (406E) is deactivated because NIC B (402B) includes at least one inactive ring (406E, 406F). At some time t5, the load is measured at X−1. Because the load does not exceed X+1 and is not below X−1, no action is taken. At some time t6, the load is measured at X−2. Because the load is below X−1, a ring is deactivated. Ring D (406D) is deactivated because NIC B (402B) includes at least one inactive ring (406E, 406F). At some time t7, the load is measured at X−4. Because the load is below X−1, a ring is deactivated. Ring C (406C) is deactivated because NIC B (402B) includes no active rings. Finally, at some point t8, the load is measured at X+2. Because the load now exceeds X+1, one ring is activated. Ring C (406C) is activated because NIC A (402A) includes at least one other active ring (406A, 406B), and NIC B (402B) does not include any active rings.

Figure 5:
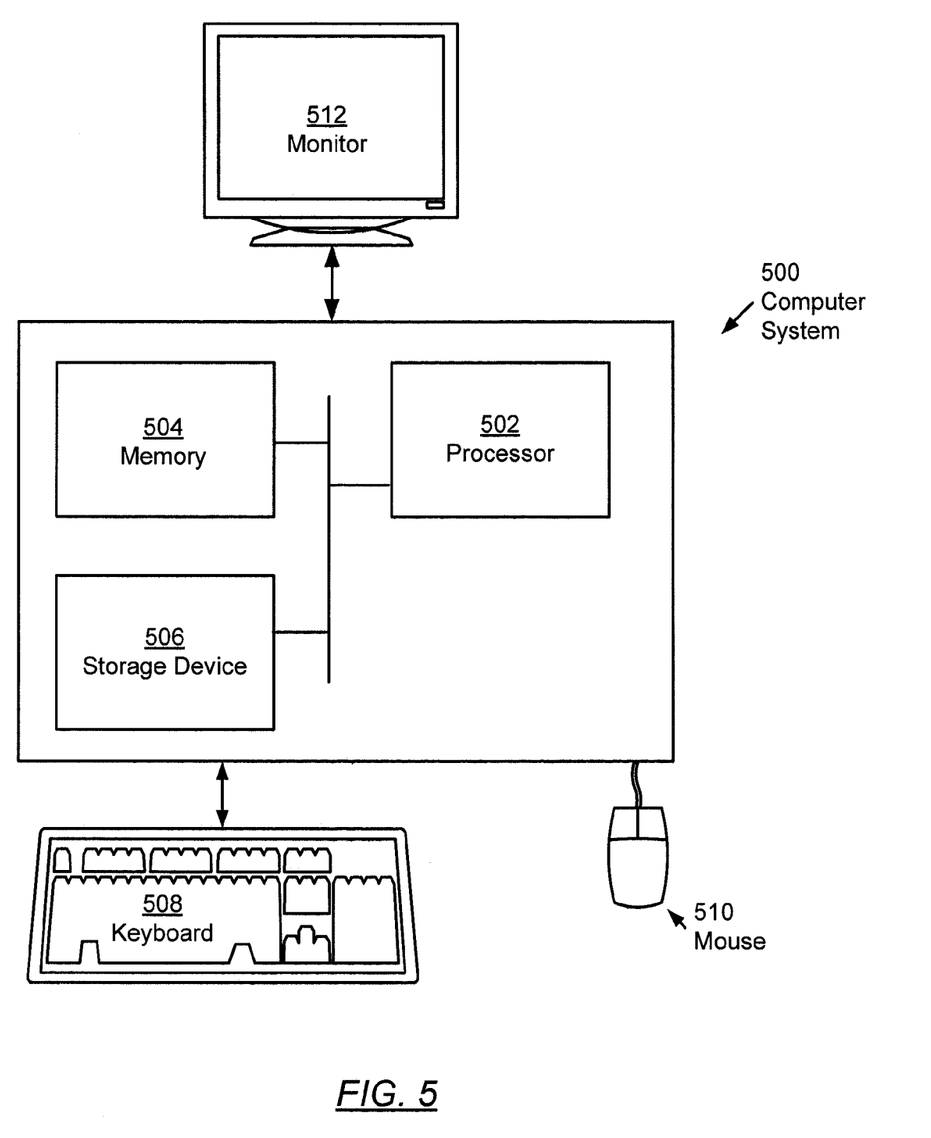
FIG. 5 shows a computer system in accordance with one or more embodiments of the invention.

An embodiment of the invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network via a network interface connection (not shown). Those skilled in the art will appreciate that these input and output means may take other forms. Further, those skilled in the art will appreciate that one or more elements of the aforementioned computer (500) may be remotely located and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a first physical network interface card (NIC) comprising a plurality of rings, wherein at least one of the plurality of rings is an active ring and wherein each ring is a portion of memory in the NIC configured to temporarily store packets; and a host, operatively connected to the first NIC, comprising a Media Access Control (MAC) layer configured to:

obtain a power management policy, wherein the power management policy specifies a maximum rate of dropped packets by the first NIC;

obtain a load associated with the active ring;

determine, using the power management policy and the load, that the state associated with at least one of the plurality of rings must be changed; and change, in response to the determining, the state of at least one of the plurality of rings.

2. The system of claim 1, further comprising:
a second NIC comprising a plurality of rings.

3. The system of claim 1, wherein obtaining a load associated with the active ring comprises determining a rate at which packets are serviced by the active ring.

4. The system of claim 1, wherein each of the plurality of rings is one selected from a group consisting of an active ring and an inactive ring.

5. The system of claim 1, wherein changing the state of at least one of the plurality of rings comprises one selected from a group consisting of deactivating an active ring to obtain an inactive ring and activating an inactive ring to obtain an active ring.

6. The system of claim 1, wherein the first NIC is one of a plurality of NICs in a NIC group.

7. A non-transitory computer readable medium comprising software instructions for managing datalinks, wherein the software instructions, when executed, perform a method, the method comprising:

obtaining, by a Media Access Control (MAC) layer executing on a host, a power management policy, wherein the power management policy specifies a maximum rate of dropped packets by a physical network interface card (NIC);

obtaining, by the MAC layer, a load associated with an active ring residing on the NIC, wherein the NIC comprises a plurality of rings and wherein each ring is a portion of memory in the NIC configured to temporarily store packets;

determining, using the power management policy and the load, that the state associated with at least one of the plurality of rings must be changed; and changing, in response to the determining, the state of at least one of the plurality of rings.

8. The non-transitory computer readable medium of claim 7, wherein each of the plurality of rings is one selected from a group consisting of an active ring and an inactive ring.

9. The non-transitory computer readable medium of claim 7, wherein changing the state of at least one of the plurality of rings comprises one selected from a group consisting of deactivating an active ring to obtain an inactive ring and activating an inactive ring to obtain an active ring.

10. The non-transitory computer readable medium of claim 7, wherein the NIC is one of a plurality of NICs in a NIC group.

11. A method for managing datalinks, comprising:

obtaining, by a Media Access Control (MAC) layer executing on a host, a power management policy, wherein the power management policy specifies a maximum rate of dropped packets by a physical network interface card (NIC);

obtaining, by the MAC layer, a load associated with an active ring residing on the NIC, wherein the NIC comprises a plurality of rings, and wherein the NIC is operatively connected to the host and wherein each ring is a portion of memory in the NIC configured to temporarily store packets;

determining, using the power management policy and the load, that the state associated with at least one of the plurality of rings must be changed; and changing, in response to the determining, the state of at least one of the plurality of rings.

12. The method of claim 11, wherein each of the plurality of rings is one selected from a group consisting of an active ring and an inactive ring.

13. The method of claim 11, wherein changing the state of at least one of the plurality of rings comprises one selected from a group consisting of deactivating an active ring to obtain an inactive ring and activating an inactive ring to obtain an active ring.

14. The method of claim 11, wherein the NIC is one of a plurality of NICs in a NIC group.

* * * * *